(No Model.) 2 Sheets—Sheet 1.
J. W. HYATT.
FILTER CONSTRUCTION AND SCREEN.
No. 364,934. Patented June 14, 1887.
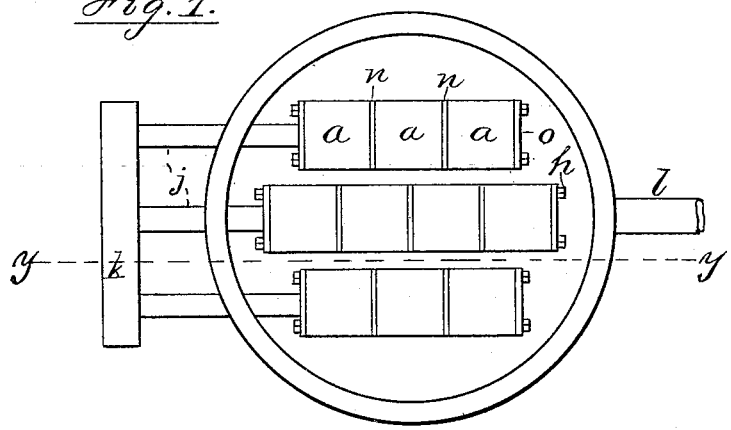
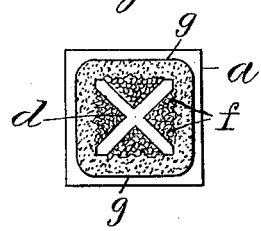
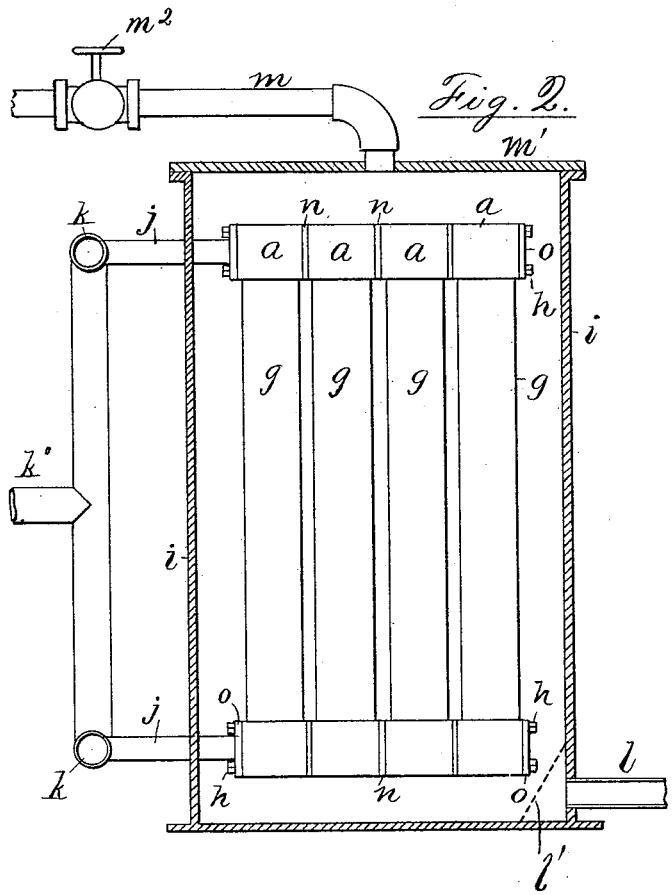
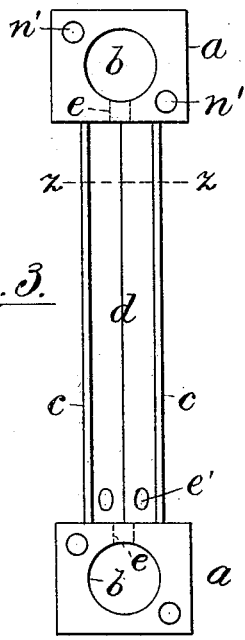
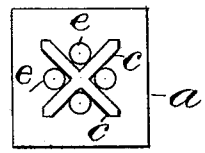
Attest:
L. Lell.
Henry J. Theberath.
Inventor.
John W. Hyatt,
per Crane & Willer, Attys.

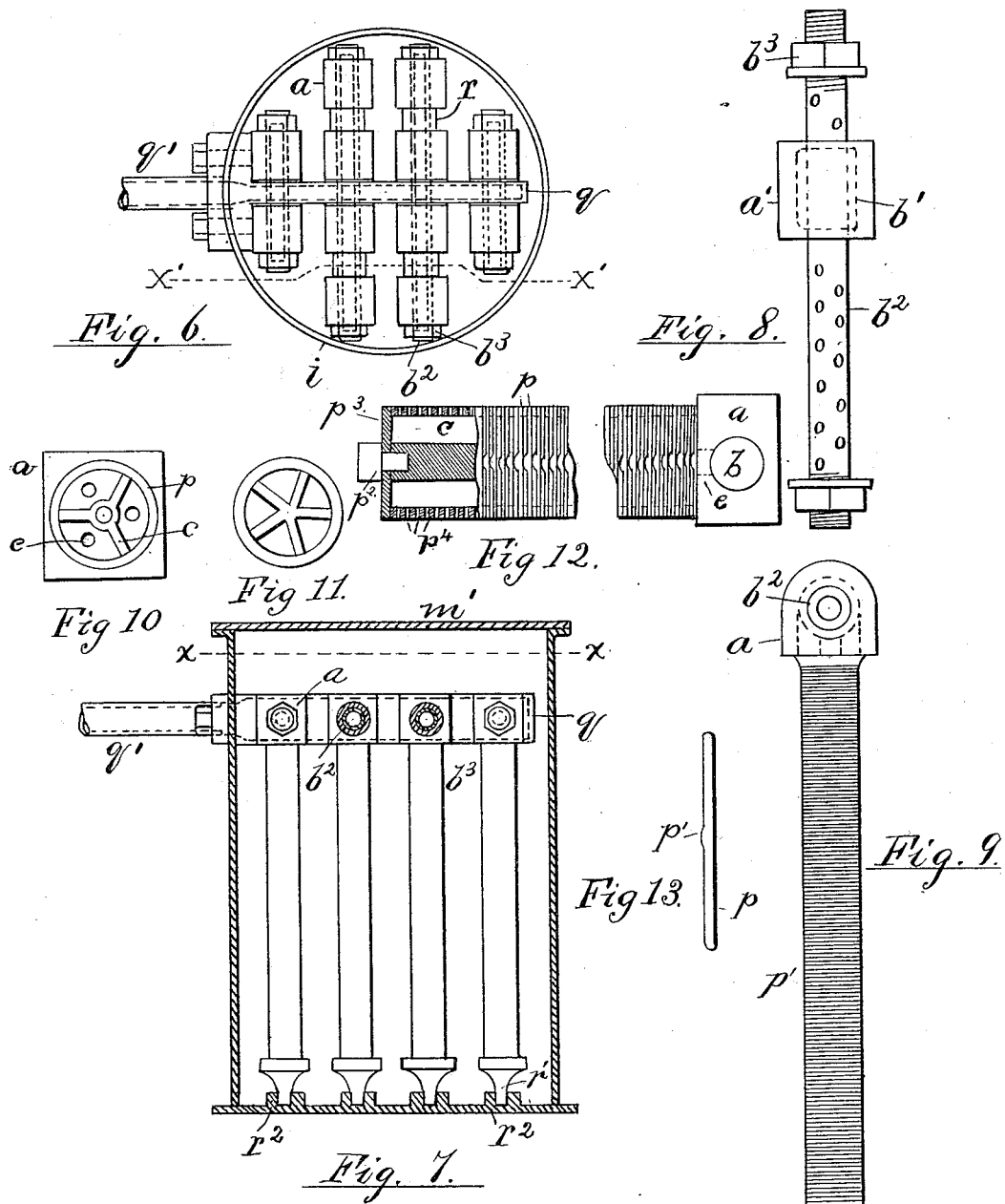

UNITED STATES PATENT OFFICE.

JOHN W. HYATT, OF NEWARK, NEW JERSEY.

FILTER CONSTRUCTION AND SCREEN.

SPECIFICATION forming part of Letters Patent No. 364,934, dated June 14, 1887.

Application filed January 13, 1887. Serial No. 224,210. (No model.)

*To all whom it may concern:*

Be it known that I, JOHN W. HYATT, a citizen of the United States, residing at Newark, Essex county, New Jersey, have invented certain new and useful Improvements in Filter Construction and Screens, fully described and represented in the following specification and the accompanying drawings, forming a part of the same.

My invention consists in the formation of a filtering-prism with a foundation of longitudinal ribs joined together to form intervening valleys or gutters, and having the filtering agent applied adjacent to such ribs, and the fluid conducted from the interior of the filtering-surface along such gutters to outlet-openings provided at the ends of the same.

In the drawings, Figure 1 is a plan of a filter-casing inclosing prisms connected with outlet-pipes at both ends, the cover being removed from the casing. Fig. 2 is a vertical section of such filter on line $y\ y$ in Fig. 1. Fig. 3 is a side view of the foundation-ribs for a prism, having outlet-connections at both ends. Fig. 4 is a transverse section of the same on line $z\ z$ in Fig. 3, including the head of the prism. Fig. 5 is a section of the body of the prism at the same point with a composition coating applied outside the ribs to form the filtering medium. Fig. 6 is a transverse section on line $x\ x$ in Fig. 7 of a filter-casing containing prisms having outlet-pipes at their upper end only, and provided with guides at their lower end. Fig. 7 is a vertical section of such filter on line $x'\ x'$ in Fig. 6. Fig. 8 is an enlarged view of one of the tie-pipes having the head of a prism thereon. Fig. 9 is a side view of a prism with outlet at the upper end only and having the filtering medium formed of wire wrapped spirally around the corners of the longitudinal ribs, as claimed by me in my patent application No. 216,818. Figs. 10 and 11 are transverse sections of prisms formed respectively with three and five ribs and surrounded by metallic rings. Fig. 12 is a side view of the prism sectioned in Fig. 10. Fig. 13 is an edge view of one ring $p$ on a larger scale.

Fig. 3 shows the prism formed with two heads or end pieces, $a$, having transverse holes $b$, and made of cast metal, integral with four intermediate ribs, $c$. The valleys or gutters $d$ between the ribs are connected with the channels $b$ by apertures $e$, and the ribs themselves may also be perforated, as at $c'$.

In Fig. 5 the gutters $d$ are shown filled with a coarse granular composition, $f$, surrounded by a fine porous composition, $g$, which operates as the filtering medium.

The method of forming a porous and artificial composition is claimed by me in a separate patent application, No. 222,806.

In Figs. 10 and 11 the castings are shown formed, respectively, with three and five ribs, and the filtering medium consists in a series of rings, $p$, slipped over the exterior of the ribs and separated by projections $p'$, as in Fig. 12, in a sufficient degree to form fine annular spaces $p^1$ for the passage of the fluid. Such metallic rings may be readily obtained of suitable thickness, and the projections $b'$ be formed thereon with suitable dies, so that the spaces between the rings will not exceed four or five thousandths of an inch. A bolt, $p^2$, and washer $p^3$, applied to the end of the prism at the intersection of the ribs, serve to clamp them all firmly against the head $a$. In Fig. 9 the ribs are covered by a spiral wrapping of wire, $p'$.

In these various constructions for the filtering-prism the fluid percolates through the screen formed of the composition $g$ or wires $p$ into the gutters $d$, and thence into the holes $b$, from which it passes to the outlet-pipes.

In Figs. 1 and 2 the prisms are shown formed with transverse holes $b$ at each end and holes $n'$, through which bolts $h$ may be passed. In Figs. 1 and 2 three groups of the prisms, adapted to nearly fill the interior of the casing, are shown, formed by applying covers $o$ to the heads of the outer prisms in each group and clamping the heads $a$ together, with packings $n$ between them, by means of the bolts $h$, pipes $j$ being attached to the covers and extended through the casing to headers $k$, from which the purified water would be drawn as by branch $k'$.

In Figs. 6 to 9 the prism is shown formed with a head, $a$, at one end only, and the transverse hole enlarged internally at $b'$ and fitted to a perforated pipe, $b^3$, which is provided at its opposite ends with screw-threads and nuts $b^3$, to clamp the heads $a$ together. A central tubular connection, $q$, is projected from the side of the casing and perforated transversely to admit the pipes $b^2$, by means of which the heads $a$ are clamped to the connection $q$. A pipe, $q'$, is connected with the interior of the connection $q$, and collars $r$ are shown inserted between certain of the heads $a$ to hold them at a uniform distance apart, suitable packings being inserted between the different joints to make them water-tight, and the holes in the pipes $b^2$ serving to collect the water from the heads of the different prisms and to convey it to the connection $q$, into which it would be discharged by such of the holes as lead thereto.

The lower ends of the prisms in Figs. 7 and 9 are shown formed with studs $r'$, and the lower part of the filter-casing is formed with sockets $r^2$, into which the studs are fitted to retain them in their normal position and to prevent breakage by jarring in transportation.

In the constructions thus described the water would be supplied to the filter-casing by any convenient means, as the pipe $l$ in Fig. 2; and if the casing be closed, as by the cover $m'$ in Figs. 2 and 7, the pressure of the fluid upon the outer sides of the prisms would force it into the internal channels and discharge it from the outlet-pipes $j$ or $q'$. It is obvious that in case of necessity a suction device may be applied to the outlet-pipes $k'$ or $q'$, as is done in other filtering apparatus. A perforated screen, $l'$, Fig. 2, may be applied to the mouth of the inlet-pipe to prevent the sand within the casing from clogging such pipe when the filter is at rest.

I have claimed generically in my patent application No. 216,818 a filtering screen or medium formed of a wire wound spirally upon a hollow support. As the ribbed construction which I have shown for the prism-foundations herein affords a hollow support to the spiral wire shown in Fig. 9, it would be obviously included in the generic claim of my prior application, No. 219,574, and I have therefore limited myself in my present application to a particular construction for the hollow support or prism-foundation, consisting in longitudinal ribs intersecting one another at the center, with intervening gutters with outlets at one or both ends, and not requiring rows of holes, as would a hollow pipe, for the transmission of the percolated fluid. Such construction offers certain advantages over a tubular pipe or support, as it may be readily cast of any desired size without the use of cores for the formation of internal passages.

It is obvious that the prism-foundation may be constructed, of the form shown herein, of other materials than cast-iron, as terra-cotta or porcelain may be used for such part of the construction, and the heads of the prisms clamped together with water-tight joints formed of soft india-rubber packings. It is also obvious that the function of the gutters is to collect the percolated fluid from the filtering medium which may be used to inclose such gutters, and the character of such medium is therefore also immaterial to my invention; and I have described such medium made of a porous composition, $g$, and of parallel metallic strips or rings $p$, to show the various means which may be employed to inclose such gutters.

It will be noticed that in all the constructions illustrated the longitudinal ribs $c$ intersect one another at the center of the prism, as is shown in Figs. 4, 5, 10, and 11, and that no central bore or passage is required, as in Royce's United States Patent No. 98,343 and Le Tellier's, No. 169,362. My invention is thus readily distinguished from the tubular or hollow constructions shown in said patents. I do not use such tubular constructions for the reasons just named, but entirely disclaim herein the said United States patents and all constructions requiring a hollow or bore at the center. The only channels I use to conduct the fluid from the inner surface of the filtering medium are the gutters or valleys $d$, which are really upon the exterior of the foundation-pieces, and communicate with the outlet-pipe only through or by holes $e$ at the actual ends of the gutters.

Having thus set forth my invention, what I claim herein is—

1. A filtering-prism consisting in a foundation formed with longitudinal intersecting ribs, gutters between said ribs to receive the filtered fluid, a head formed at one end of the ribs, an aperture in such head to discharge the filtered fluid, outlets from the gutters into such aperture, and a filtering medium applied to said ribs to inclose the said gutters, substantially as herein set forth.

2. A filtering-prism consisting in a foundation formed with longitudinal intersecting ribs, gutters between said ribs to receive the filtered fluid, a head formed at one end of the ribs, an aperture in such head to discharge the filtered fluid, outlets from the gutters into such aperture, and a series of rings clamped upon the exterior of the ribs with intermediate spaces, substantially as herein shown and described.

3. A filtering-prism consisting in a foundation formed with longitudinal intersecting ribs, gutters between said ribs to receive the filtered fluid, a head formed at one end of the ribs, an aperture in such head to discharge the filtered fluid, a filtering medium applied to the ribs to inclose the gutters, and outlets from the gutters into the aperture in the head, substantially as herein set forth.

4. In a filter, the combination, with an inclosing-casing, of a series of filtering-prisms formed of longitudinal intersecting ribs and heads provided with corresponding apertures, means for clamping the heads of the prisms together with water-tight joints, and means for conducting the fluid from the apertures in the heads, substantially as herein set forth.

5. In a filter, the combination, with an inclosing-casing, of a series of filtering-prisms formed of longitudinal intersecting ribs and heads provided with corresponding apertures, perforated pipes inserted through said apertures, with a nut to clamp the heads together, and a header to sustain such perforated pipes and receive the fluid therefrom, substantially as herein set forth.

6. In a filter, the combination, with an inclosing-casing, of a series of filtering-prisms formed of longitudinal intersecting ribs and heads provided with corresponding apertures, perforated pipes inserted through said apertures, with a nut to clamp the heads together, a header to sustain such perforated pipes to receive the fluid therefrom and to suspend the prisms within the casing, studs projected from the lower ends of the prisms, and guides fitted to such studs within the casing, as and for the purpose set forth.

In testimony whereof I have hereunto set my hand in the presence of two subscribing witnesses.

JOHN W. HYATT.

Witnesses:
   THOS. S. CRANE,
   SAMUEL A. MILLER.